(12) United States Patent
Takahata et al.

(10) Patent No.: US 10,125,651 B2
(45) Date of Patent: Nov. 13, 2018

(54) EXHAUST PURIFICATION SYSTEM FOR SHIP

(71) Applicant: YANMAR CO., LTD., Osaka-shi, Osaka (JP)

(72) Inventors: Yasuyuki Takahata, Osaka (JP);
Tetsuya Yokoyama, Osaka (JP);
Tsuyoshi Inoue, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 46 days.

(21) Appl. No.: 15/270,865

(22) Filed: Sep. 20, 2016

(65) Prior Publication Data

US 2017/0009630 A1    Jan. 12, 2017

Related U.S. Application Data

(63) Continuation of application No. PCT/JP2015/056376, filed on Mar. 4, 2015.

(30) Foreign Application Priority Data

Mar. 20, 2014 (JP) .................................. 2014-059122
Apr. 21, 2014 (JP) .................................. 2014-087598

(51) Int. Cl.
*F01N 3/28* (2006.01)
*F01N 3/20* (2006.01)
*F01N 9/00* (2006.01)
*B63H 21/32* (2006.01)
(Continued)

(52) U.S. Cl.
CPC ....... *F01N 3/2892* (2013.01); *B01D 53/9409* (2013.01); *B01D 53/9495* (2013.01);
(Continued)

(58) Field of Classification Search
CPC ........ F01N 3/2066; F01N 3/2892; F01N 9/00;
F01N 2240/20; F01N 2240/36; F01N
2390/00; F01N 2410/00; F01N 2590/02;
F01N 2610/02; B01D 53/9409; B01D
53/9495; B01D 2251/2067; B01D
2258/012; B01D 2259/4566; B63H 21/32;
B01F 3/04049; B01F 5/0451; B01F
5/0616; B01F 2005/0017; B01F
2005/0088; B01F 2005/0628; B01F
2005/0637; Y02T 10/24; Y02T 10/47
See application file for complete search history.

(56) References Cited

U.S. PATENT DOCUMENTS 5,946,906 A    9/1999  Akazaki et al.
6,584,767 B1 *  7/2003  Koenig ................. F01N 13/087
                                                        137/595

(Continued)

FOREIGN PATENT DOCUMENTS

EP    0844373 A1    5/1998
EP    2693011 A1    2/2014
(Continued)

*Primary Examiner* — Audrey K Bradley
(74) *Attorney, Agent, or Firm* — Norton Rose Fulbright US LLP

(57) ABSTRACT

An exhaust purification system for a ship includes a main path in communication with the outside and a bypass path branched from an intermediate portion of the main path, each serving as a discharge path for an engine installed in the ship. The main path and the bypass path are provided with and opened and closed by respective fluid operated switching valves of a normally open type.

7 Claims, 17 Drawing Sheets

(51) Int. Cl.
    *B01D 53/94* (2006.01)
    *B01F 5/04* (2006.01)
    *B01F 5/06* (2006.01)
    *B01F 3/04* (2006.01)
    *B01F 5/00* (2006.01)

(52) U.S. Cl.
    CPC ........ *B01F 3/04049* (2013.01); *B01F 5/0451* (2013.01); *B01F 5/0616* (2013.01); *B63H 21/32* (2013.01); *F01N 3/2066* (2013.01); *F01N 9/00* (2013.01); *B01D 2251/2067* (2013.01); *B01D 2258/012* (2013.01); *B01D 2259/4566* (2013.01); *B01F 2005/0017* (2013.01); *B01F 2005/0088* (2013.01); *B01F 2005/0628* (2013.01); *B01F 2005/0637* (2013.01); *F01N 2240/20* (2013.01); *F01N 2240/36* (2013.01); *F01N 2390/00* (2013.01); *F01N 2410/00* (2013.01); *F01N 2590/02* (2013.01); *F01N 2610/02* (2013.01); *Y02T 10/24* (2013.01); *Y02T 10/47* (2013.01)

(56) References Cited

U.S. PATENT DOCUMENTS

| | | | |
|---|---|---|---|
| 7,121,088 B2 * | 10/2006 | Lavin | F01N 1/166 137/595 |
| 7,845,338 B2 * | 12/2010 | Smith | F28D 7/1669 123/568.12 |
| RE42,056 E | 1/2011 | Akazaki et al. | |
| RE43,588 E | 8/2012 | Akazaki et al. | |
| 2007/0101703 A1 | 5/2007 | Kanaya et al. | |
| 2009/0019837 A1 | 1/2009 | Suzuki et al. | |
| 2009/0293969 A1 | 12/2009 | Le Devehat et al. | |
| 2010/0192555 A1 * | 8/2010 | Lauga | F01N 3/2066 60/303 |
| 2015/0258495 A1 | 9/2015 | Yokoyama et al. | |

FOREIGN PATENT DOCUMENTS

| | | | | |
|---|---|---|---|---|
| JP | 5-010116 A | | 1/1993 | |
| JP | 9-250338 A | | 9/1997 | |
| JP | 09250338 A | * | 9/1997 | |
| JP | 2003-269136 A | | 9/2003 | |
| JP | 2006-029233 A | | 2/2006 | |
| JP | 2006-341742 A | | 12/2006 | |
| JP | 2009-024628 A | | 2/2009 | |
| JP | 2009-505006 A | | 2/2009 | |
| JP | 2010-071149 A | | 4/2010 | |
| JP | 2010185335 A | * | 8/2010 | ............ B63H 21/32 |
| JP | 2013-213501 A | | 10/2013 | |
| WO | 2010-092855 A1 | | 8/2010 | |
| WO | 2013-112101 A1 | | 8/2013 | |
| WO | 2014057865 A1 | | 4/2014 | |

* cited by examiner

EXHAUST PURIFICATION SYSTEM FOR SHIP

CROSS-REFERENCE TO RELATED APPLICATIONS

The present application is a continuation application of International Application No. PCT/JP2015/56376, filed Mar. 4, 2015, which claims priority to Japanese Patent Application No. 2014-59122, filed Mar. 20, 2014 and Japanese Patent Application No. 2014-87598, filed Apr. 21, 2014. The contents of these applications are incorporated herein by reference in their entirety.

BACKGROUND OF THE INVENTION

The present invention relates to an exhaust purification system for a ship.

Ships, such as a tanker or a transport ship, for example, consume a large amount of power for devices such as various auxiliary machines, a cargo handling device, lights, and an air conditioner. Thus, the ships include a diesel generator as a combination of a diesel engine and a generator that is driven by the diesel engine to generate power to be supplied to an electric system of the devices (see Japanese Unexamined Patent Application Publication No. 2006-341742 and the like). The diesel engine is known as one of internal combustion engines with the highest energy efficiency, and involves a small amount of carbon dioxide in exhaust gas per unit output. Furthermore, the diesel engine can be driven with low quality fuel, such as heavy oil for example, and thus is also economically advantageous.

The exhaust gas, discharged from the diesel engine, includes carbon dioxide, as well as a large amount of nitrogen oxide, sulfur oxide, particulate matters, and the like that are mainly attributable to the heavy oil used as the fuel, and are harmful substances in terms of environmental protection. In particular, nitrogen oxide (hereinafter, referred to as NOx) is harmful to human bodies, highly acidic, and is regarded as a cause of acid rain. Thus, for example, machines driving the diesel generator, such as the ship for example, discharge an extremely large amount of NOx, and thus are regarded as imposing a large load on the global environment.

Generally employed post treatments for largely purifying NOx include selective catalytic reduction (hereinafter, referred to as SCR) using urea as a reductant. Generally, a NOx catalyst having a honeycomb structure is used in SCR. The NOx catalyst is formed of a material in which a support such as an oxide of Ti and the like supports active ingredients such as V and Cr. The aqueous urea solution in a mist form, as a reductant solution, is sprayed to an upstream side of the NOx catalyst. Thus, the aqueous urea solution is hydrolyzed by heat of the exhaust gas, whereby ammonia is produced. This ammonia, serving as the reductant, acts on NOx, whereby NOx is converted into harmless nitrogen and water.

SUMMARY OF THE INVENTION

For the global environment, NOx in the exhaust gas needs to be removed as much as possible, and the emission thereof is preferably regulated both in open sea and territorial sea. In the meantime, regulated sea areas for NOx are scheduled to be set in accordance with enactment of high level gas emission regulation for the diesel engines. As described above, the NOx catalyst has the honeycomb structure and thus might be clogged by soot and fine particles in the exhaust gas. The performance of the NOx catalyst is degraded by a sulfur component in the exhaust gas and its derivatives. Thus, in one attempt to achieve a longest possible service life of the NOx catalyst, achieve a lower running cost, and ensure that the vessel travels while conforming to regulations in the regulated sea areas, the NOx catalyst may be prevented from being exposed to the exhaust gas while the ship is travelling outside the regulated sea area.

In one configuration that has been proposed by the present applicants (see, for example, Japanese Unexamined Patent Application Publication No. 2010-71149 and the like), a purification casing containing the NOx catalyst is provided at an intermediate portion of a discharge path of an engine, and a bypass path, through which the exhaust gas bypasses the NOx catalyst, is branched from a portion of the discharge path on an upstream side of the purification casing. In this configuration, the exhaust gas is sent to a side of the purification casing while the ship is travelling in the regulated sea area, and is sent to a side of the bypass path while the ship is travelling outside the regulated sea area. Here, a path switching valve may be provided on each of the side of the purification casing and the side of the bypass path, so that an exhaust gas path can be switched. Thus, a long service life of the NOx catalyst can be achieved, a lower running cost can be achieved, and the purification performance can be maintained for a long period of time.

Unfortunately, the configuration where the path switching valves, respectively provided on the side of the purification casing and on the side of the bypass path, are operated independently from each other has the following risk. Specifically, when the path switching valve fails, the path switching valves might both be closed at the same time to close the exhaust gas path. When the exhaust gas path is thus closed while the engine is operating, the exhaust gas is trapped and the engine stops.

An object of the present invention is to provide an exhaust purification system for a ship improved in view of the current circumstance as described above.

According to a first aspect of the present invention, an exhaust purification system for a ship includes a main path in communication with outside and a bypass path branched from an intermediate portion of the main path, each serving as a discharge path for an engine installed in the ship. The main path and the bypass path are provided with and opened and closed by respective fluid operated switching valves of a normally open type.

According to a second aspect of the present invention, in the first aspect of the present invention, when a movement direction of exhaust gas is switched to be in one of the main path and the bypass path, fluid supply to the switching valves may be turned OFF, so that the switching valves may be open, and then the fluid supply may be turned ON for one of the switching valves to be closed.

According to a third aspect of the present invention, in the first aspect of the present invention, a valve body of the switching valve on a side of the main path may be provided with a mixing fin that produces a turbulent flow of exhaust gas while the switching valve is open, and a reductant injection nozzle may be provided on a downstream side of the switching valve on the side of the main path.

According to a fourth aspect of the present invention, an exhaust purification system for a ship includes a main path in communication with outside and a bypass path branched from an intermediate portion of the main path, each serving as a discharge path for an engine installed in the ship. The main path and the bypass path are provided with and opened and closed by respective switching valves, and the switching valves are coupled to each other via a link mechanism to operate in a linked manner so that when one of the switching valves is open, the other one of the switching valves is closed.

According to a fifth aspect of the present invention, in the fourth aspect of the present invention, the link mechanism may have a duplex structure.

According to a sixth aspect of the present invention, an exhaust purification system for a ship including a main path in communication with outside and a bypass path branched from an intermediate portion of the main path, each serving as a discharge path for an engine installed in the ship. The main path and the bypass path are provided with and opened and closed by respective switching valves that are axially supported by a single rotation shaft.

According to a seventh aspect of the present invention, in the sixth aspect of the present invention, the switching valves may have attachment phases, relative to the single rotation shaft, shifted from each other by 90°.

In the embodiment of the present invention, the switching valve operated by fluid to open and close each of the paths is of a normally open type. Thus, the main path and the bypass path would not be closed at the same time, even when the fluid supply to both switching valves is turned OFF at the same time at a timing of switching the exhaust gas path or the like, while the engine is operating. Thus, even when the switching valve fails, the exhaust gas path is not closed while the engine is operating, whereby the engine can be prevented from stopping.

In the embodiment of the present invention, the valve body of the switching valve on the side of the main path is provided with the mixing fin, and the reductant injection nozzle is provided on the downstream side of the switching valve on the side of the main path. Thus, the reductant is injected into the exhaust gas flowing in the turbulent flow produced by the mixing fin, and thus can be efficiently mixed with the exhaust gas. Thus, NOx in the exhaust gas can be efficiently reduced, and thus can be removed as much as possible.

In the embodiment of the present invention, the switching valves that open/close the paths are coupled to each other via the link mechanism to operate in a linked manner so that when one of the switching valves is open, the other one of the switching valves is closed. Thus, one of the switching valves is definitely open, so that complete closing of the paths is prevented, whereby the main path and the bypass path are not closed at the same time. Thus, the exhaust gas path is not closed while the engine is operating, whereby the engine can be prevented from stopping.

In the embodiment of the present invention, the link mechanism has the duplex structure. Thus, even when one link mechanism is damaged or fails, the switching valves can be operated by the remaining link mechanism. This ensures that both paths are prevented from completely closing at the same time. Furthermore, an attempt to achieve a higher redundancy of a link structure for the switching valves can be facilitated.

In the embodiment of the present invention, the switching valves that open/close the paths are axially supported by the single rotation shaft. Thus, the switching valves can be operated in a linked manner with the single rotation shaft, whereby the link structure for the switching valves can be simplified.

In the embodiment of the present invention, the switching valves have attachment phases, relative to the single rotation shaft, shifted from each other by 90°. Thus, the switching valves are operated in a linked manner so that when one of the switching valves is open, the other one is closed. Thus, one of the switching valves is definitely open, whereby the main path and the bypass path are not closed at the same time. This ensures that both paths can be prevented from completely closing at the same time while the engine is operating, with a simple structure.

DESCRIPTION OF THE EMBODIMENTS

Embodiments where the present invention is implemented by being applied to a diesel generator installed in a ship are described below with reference to the drawings.

(1) Overview of Ship

Figure 1:
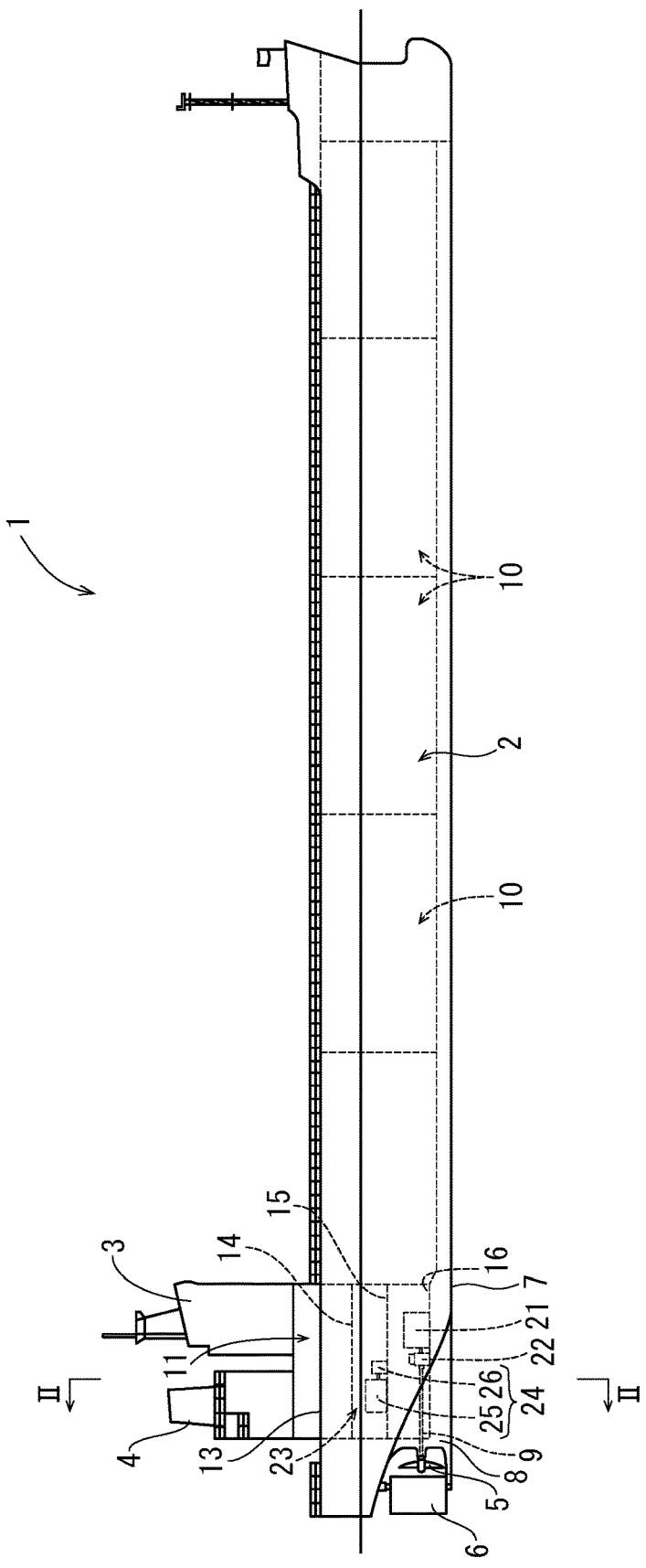
FIG. 1 is a side view of a ship in its entirety.

First of all, an overview of a ship 1 according to a first embodiment is described with reference to FIG. 1. The ship 1 according to the first embodiment includes: a hull 2; a cabin 3 (bridge) disposed on a stem side of the hull 2; a funnel 4 disposed behind the cabin 3; and a propeller 5 and a rudder 6 disposed at a rear lower portion of the hull 2. In this configuration, a skeg 8 is integrally formed with a portion of a ship bottom 7 on the stem side. The skeg 8 axially supports a propeller shaft 9 that drivingly rotates the propeller 5. A hold 10 is disposed over port side and center portions in the hull 2. An engine room 11 is disposed in a stem side portion of the hull 2.

The engine room 11 incorporates: a main engine 21 (diesel engine in the first embodiment) and a reducer 22 as a driving source for the propeller 5; and a generator device 23 that supplies power to an electric system in the hull 2. The propeller 5 is drivingly rotated by rotational force transmitted from the main engine 21 through the reducer 22. An inner portion of the engine room 11 has vertically arranged sections defined by an upper deck 13, a second deck 14, a third deck 15, and an inner bottom plate 16. In the first embodiment, the main engine 21 and the reducer 22 are installed on the inner bottom plate 16 as the lowermost stage of the engine room 11. The generator device 23 is installed on the third deck 15 as a middle stage of the engine room 11. Although not elaborated in the figure, the hold 10 is divided into a plurality of sections.

Figure 2:
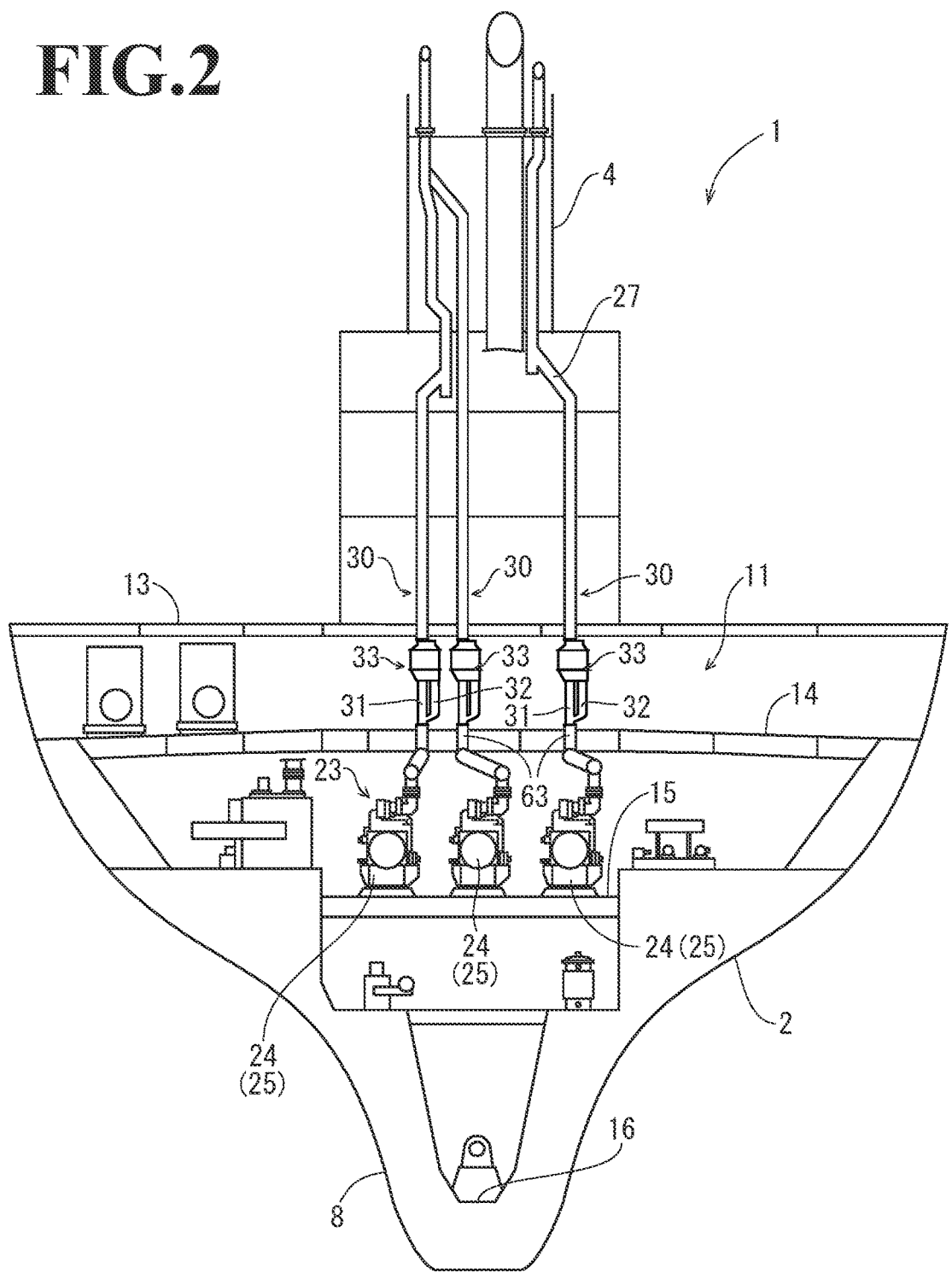
FIG. 2 is a front cross-sectional view taken along a line II-II in FIG. 1.

As illustrated in FIG. 2, the generator device 23 includes a plurality of (three in the first embodiment) diesel generators 24. The diesel generators 24 are each a combination of a generator engine 25 (a diesel engine in the first embodiment) and a generator 26 that is driven by the generator engine 25 to generate power. Basically, the diesel generators 24 are configured to efficiently operate in accordance with an amount of power required in the hull 2. For example, the ship entering and leaving the port consumes relatively large amount of power, and thus operates all the diesel generators 24, whereas the anchored ship consumes a relatively small amount of power, and thus operates any appropriate number of diesel generators 24. The power generated by each of the generators 26 under operation is supplied to the electric system in the hull 2. Although not elaborated in the figure, each of the generators 26 is electrically connected to a power transducer that detects the power generated by the generator 26.

(2) Exhaust System for Generator Device

Next, an exhaust system for the generator device 23 will be described with reference to FIGS. 2 to 6. Each generator engine 25 is connected to an intake path (not illustrated) through which air is taken in and a discharge path 30 through which exhaust gas is discharged. The air taken in through the intake path is sent into each cylinder (into the cylinder in an intake stroke) of the generator engine 25. When a compression stroke is completed in each cylinder, fuel sucked up from a fuel tank is sent into a combustion chamber of each cylinder by a fuel injection device. An expansion stroke is initiated by self-ignited combustion of mixed air in each combustion chamber.

The discharge path 30 of each generator engine 25 extends to the funnel 4, and is in direct communication with the outside. As described above, there are three generator engines 25, and thus three discharge paths 30 are provided. The discharge path 30 of each generator engine 25 includes: a main path 31 extending to the funnel 4; a bypass path 32 branched from an intermediate portion of the main path 31; and a composite casing 33 in communication with both the main path 31 and the bypass path 32. As described above, in the first embodiment, the plurality of generator engines 25 are installed, and one exhaust purification system, including the main path 31, the bypass path 32, the composite casing 33, and the like, is provided for each generator engine 25.

The composite casing 33 is made of a refractory metal material, has an approximately tubular shape (a square tube in the first embodiment), and is arranged at a portion higher than the third deck 15 on which each generator engine 25 is disposed. In this configuration, the composite casing 33 is positioned on an upper side of the engine room 11 (on the second deck 14 as an upper stage of the engine room 11). The composite casing 33 incorporates a NOx catalyst 34 and a slip processing catalyst 35 (described in detail below) disposed on a side of the main path 31. The NOx catalyst 34 serves as a selective catalytic reduction device that causes the reduction of NOx in the exhaust gas from the generator engine 25. The bypass path 32 is a path through which the exhaust gas bypasses the NOx catalyst 34 and the slip processing catalyst 35. The main path 31 and the bypass path 32 merge at an exhaust outlet 42 (on a downstream side with respect to the slip processing catalyst 35 in a movement direction of the exhaust gas (hereinafter, simply referred to as a downstream side)) of the composite casing 33. A selective catalytic reduction device including only the NOx catalyst 34 and not including the slip processing catalyst 35 may also be employed.

A branching portion between the main path 31 and the bypass path 32 outside the composite casing 33 is provided with a path switching member for switching the movement direction of the exhaust gas between the main path 31 and the bypass path 32. The path switching member includes a main side switching valve 37 and a bypass side switching valve 38 that are each a fluid-operated single-acting switching valve in the present embodiment. An example of the fluid-operated single-acting switching valve, used as the main side switching valve 37 and the bypass side switching valve 38, includes a pneumatic butterfly valve. The main side switching valve 37 is provided on a side of an inlet of the composite casing 33 in the main path 31, whereas the bypass side switching valve 38 is provided on a side of an inlet of the composite casing 33 in the bypass path 32.

Next, a configuration of the composite casing 33 will be described with reference to FIGS. 3 to 6. As described above, the composite casing 33 is in communication with both the main path 31 and the bypass path 32. The composite casing 33 incorporates the NOx catalyst 34 and the slip processing catalyst 35 that are serially arranged in this order from an upstream side in the movement direction of the exhaust gas (hereinafter, simply referred to as an upstream side) on the side of the main path 31. The NOx catalyst 34 causes the reduction of NOx in the exhaust gas. The slip processing catalyst 35 causes oxidation processing for excessively supplied reductant (aqueous urea solution, more specifically, ammonia as a result of hydrolysis). Each of the catalysts 34 and 35 has a honeycomb structure including a plurality of cells defined with porous (filtering) partition walls, and includes catalyst metal such as alumina, zirconia, vanadia-titania, and zeolite.

The NOx catalyst 34 selectively reduces NOx in the exhaust gas with the reductant, which is ammonia as a result of hydrolyzing the aqueous urea solution from an aqueous urea solution injection nozzle 61 described later. Thus, the exhaust gas sent to the side of the main path 31 in the composite casing 33 is purified. The slip processing catalyst 35 converts unreacted (excessive) ammonia flowed out from the NOx catalyst 34 into harmless nitrogen, through oxidation. Here, reactions represented by the following formulae occur on the side of the main path 31 in the composite casing 33:

$(NH_2)_2CO+H_2O \rightarrow 2NH_3+CO_2$ (hydrolysis);

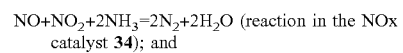
$NO+NO_2+2NH_3=2N_2+2H_2O$ (reaction in the NOx catalyst 34); and

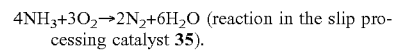
$4NH_3+3O_2 \rightarrow 2N_2+6H_2O$ (reaction in the slip processing catalyst 35).

Figure 6:
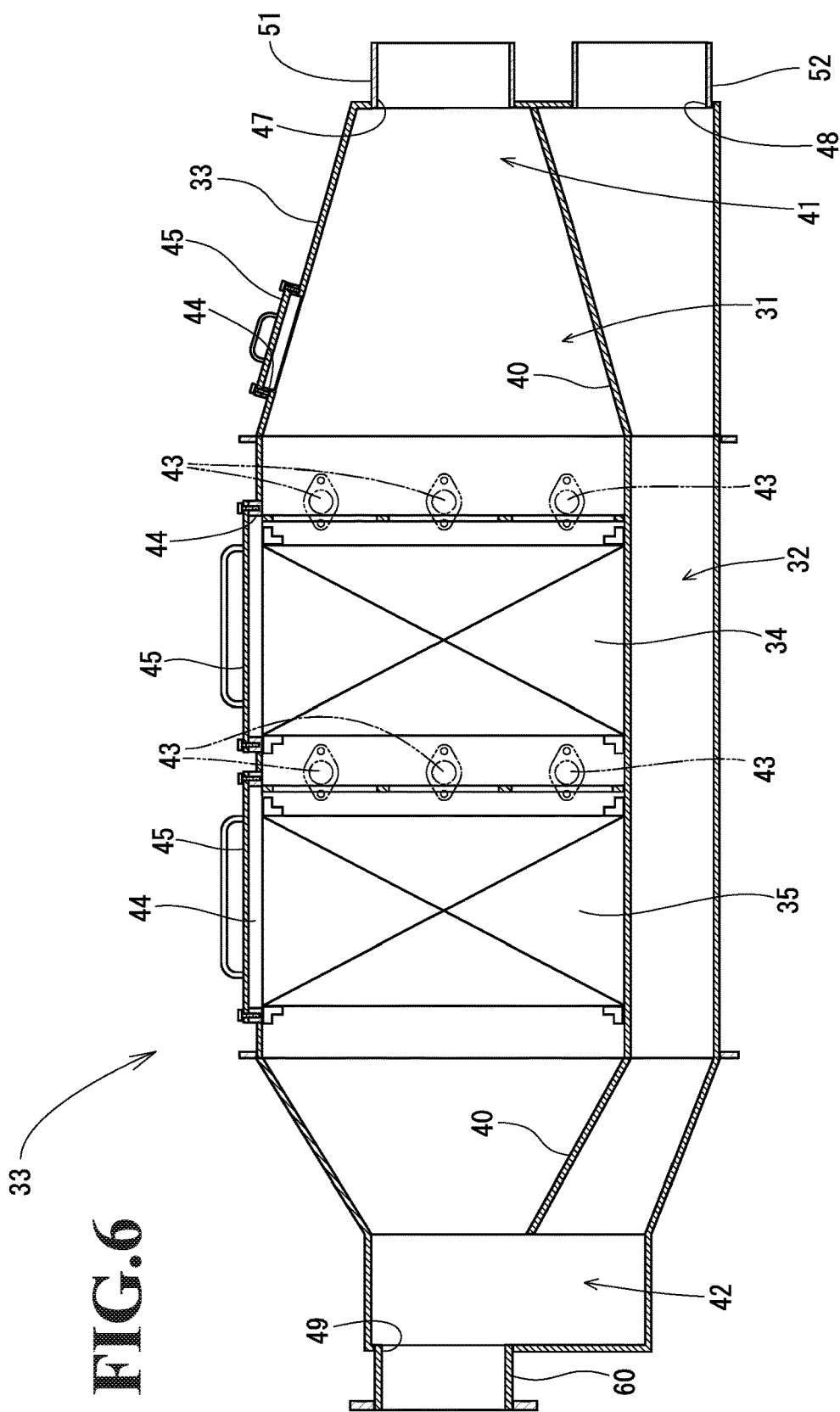
FIG. 6 is a side cross-sectional view of the composite casing.
Figure 7:
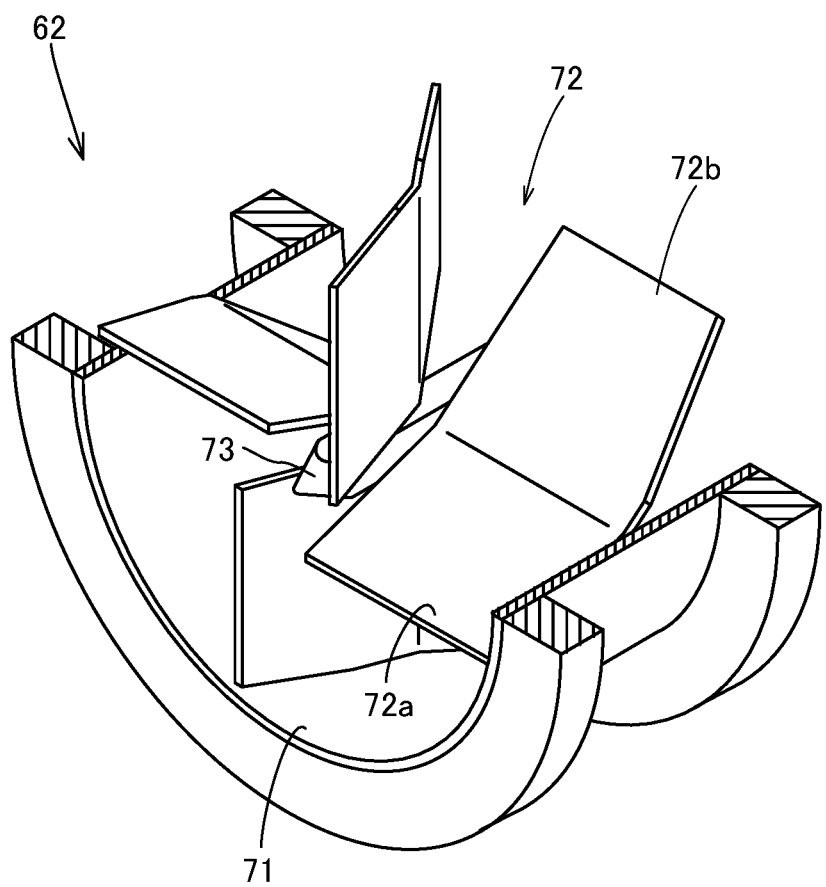
FIG. 7 is a perspective cross-sectional view of an internal structure of an exhaust gas mixer.
Figure 8:
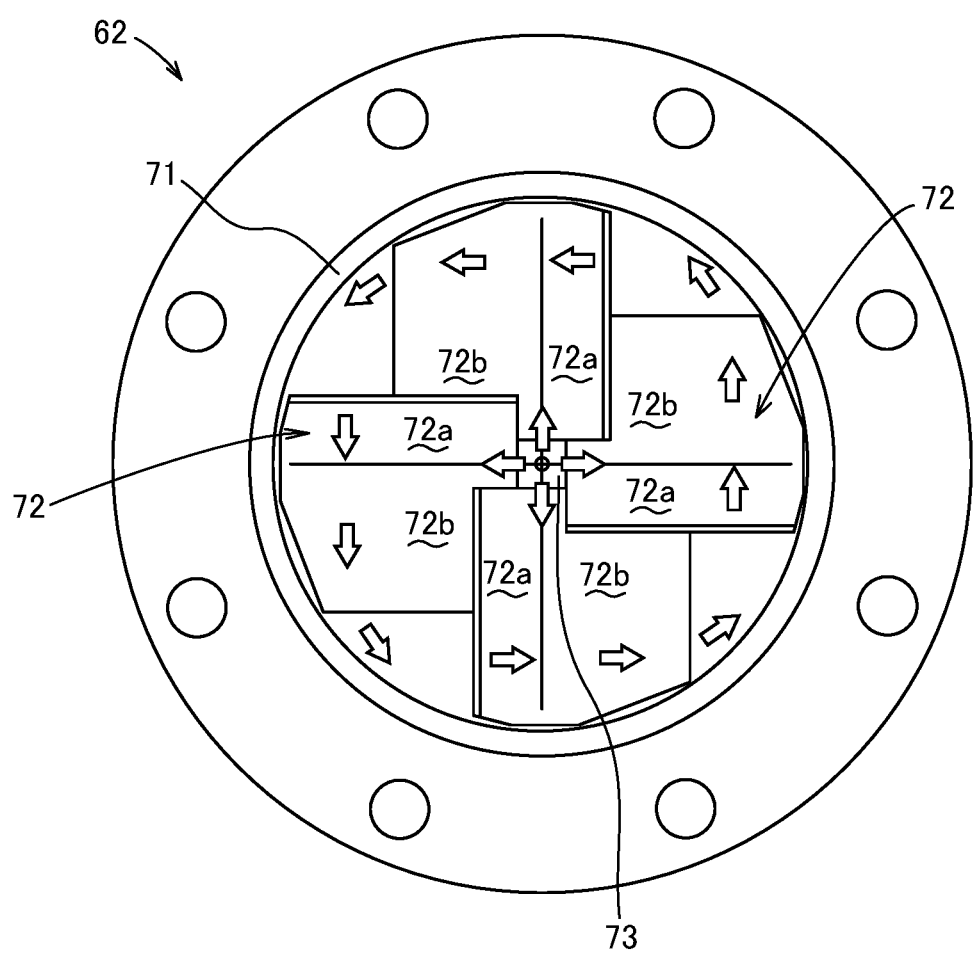
FIG. 8 is a front view of the exhaust gas mixer as viewed from an upstream side in a movement direction of exhaust gas.
Figure 9:
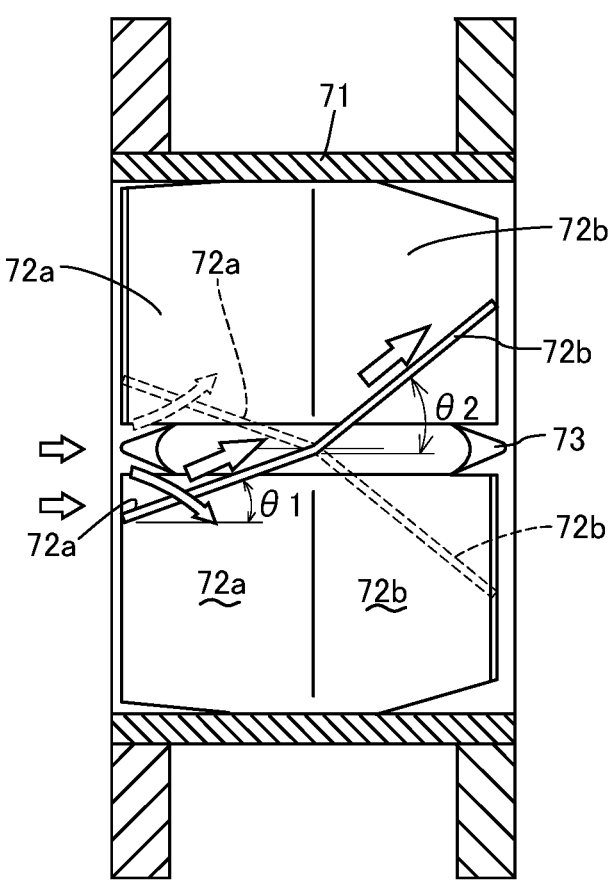
FIG. 9 is a side cross-sectional view of the exhaust gas mixer.
Figure 10:
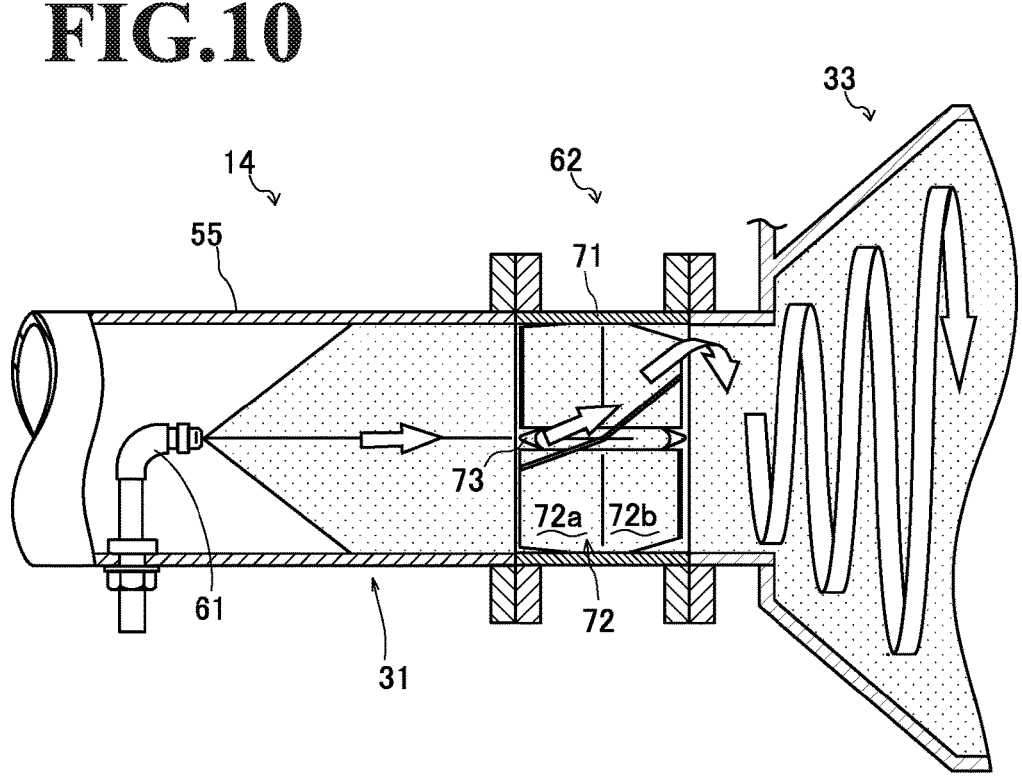
FIG. 10 is a side cross-sectional view illustrating a flow of exhaust gas from the exhaust gas mixer to the composite casing.

As illustrated in detail in FIG. 6, the main path 31 and the bypass path 32 are arranged side by side in the composite casing 33. In the composite casing 33 with such a configuration, a partition plate 40 extending along the movement direction of the exhaust gas is disposed. The composite casing 33 is divided into the side of the main path 31 and the side of the bypass path 32 by the partition plate 40. With the composite casing 33 thus divided by the partition plate 40, the NOx catalyst 34 and the slip processing catalyst 35, on the side of the main path 31, can be warmed with heat of the exhaust gas passing through the bypass path 32. Thus, the NOx catalyst 34 and the slip processing catalyst 35 can be constantly warmed to be easily kept in an active state regardless of whether the exhaust gas is being purified. As a result, the exhaust gas can be swiftly purified when the exhaust gas passes through the main side path 31 because no warming up is required.

An upstream side end portion of the partition plate 40 is in contact with and fixed to a front inner surface of an exhaust inlet portion 41 on the upstream side with respect to the NOx catalyst 34 on the side of the main path 31 in the composite casing 33. The exhaust inlet portion 41 on the side of the main path 31 in the composite casing 33 has a tapered shape (conic shape) tapered toward the upstream side with a cross-sectional area decreasing toward the upstream side. On the other hand, a downstream side end portion of the partition plate 40 does not continue into the exhaust outlet 42 that is on the downstream side with respect to the slip processing catalyst 35 in the composite casing 33. Thus, the side of the main path 31 and the side of the bypass path 32 merge at the exhaust outlet 42 of the composite casing 33.

The composite casing 33 has, on its one side surface, a plurality of injection nozzles 43, serving as injectors, disposed on the upstream side of the NOx catalyst 34 and the upstream side of the slip processing catalyst 35. In the first embodiment, three injection nozzle 43 are disposed on portions of the one side surface of the composite casing 33 on the upstream side of the NOx catalyst 34, and three injection nozzle 43 are further disposed on portions of the one side surface of the composite casing 33 on the upstream side of the slip processing catalyst 35. Each injection nozzle 43 injects compressed gas (air) from a gas supply source (not illustrated) to the NOx catalyst 34 or the slip processing catalyst 35. With this operation of the injection nozzle 43, dust accumulated on the side of the main path 31 in the composite casing 33 while the system is in operation, can be forcibly removed.

The composite casing 33 has the other surface provided with a plurality of (three in the first embodiment) inspection opening windows 44. The inspection opening windows 44 are formed for inspecting and maintaining the inner portion of the composite casing 33, the injection nozzle 43, the NOx catalyst 34, and the slip processing catalyst 35. The inspection opening windows 44 are each normally closed in an openable manner by a lid cover 45. Each lid cover 45 is detachably fastened to a circumference edge portion of a corresponding one of the inspection opening windows 44 with a bolt.

A main side flow inlet 47 and a bypass side flow inlet 48 are formed on a front surface side of the exhaust inlet portion 41 of the composite casing 33. The main side flow inlet 47 is in communication with the side of the main path 31 in the composite casing 33. The bypass side flow inlet 48 is in communication with the side of the bypass path 32 in the composite casing 33. A front outer surface side of the exhaust inlet portion 41 of the composite casing 33 is provided with a main side introduction pipe 51, in communication with the main side flow inlet 47, and a bypass side introduction pipe 52, in communication with the bypass side flow inlet 48. The main side introduction pipe 51 and the bypass side introduction pipe 52 are coupled with a forked pipe 53 respectively via relay pipes 55 and 56. Here, the main side relay pipe 55 has an inlet side fastened to a main side outlet portion 57 of the forked pipe 53 via a flange, and the other end side in communication with the main side introduction pipe 51. The bypass side relay pipe 56 has an inlet side fastened to the bypass side outlet 58 of the forked pipe 53 via a flange, and an output side fastened to the bypass side introduction pipe 52 via an adjustment pipe 69 that has an accordion structure and is used for length adjustment.

Although not elaborated in the figure, the forked pipe 53 has an inlet portion 59 coupled to the upstream side of the main path 31 via a flange. The forked pipe 53 serves as the branching portion between the main path 31 and the bypass path 32. The main side switching valve 37 is provided in the main side outlet portion 57 of the forked pipe 53 in communication with the side of the main path 31 in the composite casing 33. The bypass side switching valve 38 is provided in the bypass side outlet 58 of the forked pipe 53 in communication with the side of the bypass path 32 in the composite casing 33. A flow out port 49 is formed in a portion on a rear surface side of the exhaust outlet 42 of the composite casing 33 and on a side closer to the main path 31. An exhaust air discharge pipe 60, in communication with the flow out port 49, is disposed on a rear outer surface side of the exhaust outlet 42 of the composite casing 33. The exhaust air discharge pipe 60 is coupled to the downstream side of the main path 31 via a flange.

The aqueous urea solution injection nozzle 61 and an exhaust gas mixer 62 are arranged in this order from the upstream side, in a section between the main side switching valve 37 and the main side introduction pipe 51 coupled to the composite casing 33 in the main path 31. The aqueous urea solution injection nozzle 61 injects the reductant into the exhaust gas, and thus serves as a reductant injector of a reductant supplying device that supplies the aqueous urea solution as the reductant. The exhaust gas mixer 62 mixes the exhaust gas with the aqueous urea solution. The reductant supplying device includes: an aqueous urea solution tank (not illustrated) that stores the aqueous urea solution; a feed pump (not illustrated) that sucks up the aqueous urea solution from the aqueous urea solution tank; and the aqueous urea solution injection nozzle 61 provided to the main side relay pipe 55. The feed pump is driven so that the aqueous urea solution is fed from the aqueous urea solution tank to the aqueous urea solution injection nozzle 61 that injects the aqueous urea solution in a mist form into the main side relay pipe 55.

A nozzle inspection window 63, for inspecting and maintaining the aqueous urea solution injection nozzle 61, is provided close to the aqueous urea solution injection nozzle 61 in the main side relay pipe 55. The nozzle inspection window 63 in the normal state is closed by a lid cover 64 in an openable manner, as in the case of each of the inspection opening windows 44 described above. The lid cover 64 is detachably fastened to a circumference edge portion of the nozzle inspection window 63 with a bolt.

The exhaust gas mixer 62 is provided between the main side relay pipe 55 and the main side introduction pipe 51. The exhaust gas mixer 62 is separated from the aqueous urea solution injection nozzle 61, provided in the main side relay pipe 55, by a predetermined distance toward the downstream side. The predetermined distance is a distance required for obtaining ammonia by hydrolyzing the aqueous urea solution injected from the aqueous urea solution injection nozzle 61 in the main side relay pipe 55. As illustrated in FIGS. 7 to 10, the exhaust gas mixer 62 according to the first embodiment includes: a mixer pipe body 71 that has a tubular shape with the same internal diameter as the main side relay pipe 55 and the main side introduction pipe 51; a plurality of (four in the first embodiment) mixing fins 72 provided on an inner circumference side of the mixer pipe body 71; and an axial core body 73 positioned at an axial core of the mixer pipe body 71. The group of mixing fins 72 and the axial core body 73 produce a swirling flow of exhaust gas and aqueous urea solution, in the mist form, passing through the exhaust gas mixer 62.

The mixing fins 72 are each a member for producing the swirling flow of exhaust gas, and are radially arranged on the inner circumference side of the mixer pipe body 71 around the axial core body 73. In this configuration, the mixing fins 72 each have a side end surface on the inner side in the radial direction fixed to the axial core body 73, and has a side end surface on the outer side in the radial direction fixed to the inner circumference surface of the mixer pipe body 71. The mixing fins 72 are positioned at an equal angular interval along the circumference direction of the mixer pipe body 71 (positioned point symmetric about the axial core body 73). The number of the mixing fins 72 is not limited to four as in the first embodiment.

The mixing fins 72 each have the upstream side and the downstream side inclined with respect to the movement direction of the exhaust gas (the axial direction of the mixer pipe body 71) by a predetermined angle. More specifically, the mixing fins 72 are each bent at its intermediate portion in the movement direction of the exhaust gas. Here, the mixing fins 72 are each bent in such a manner that an upstream side fin plate portion 72a is inclined by an inclined angle θ1 with respect to the movement direction of the exhaust gas, and that a downstream side fin plate portion 72b is inclined by an inclined angle θ2 with respect to the movement direction of the exhaust gas. The inclined angle θ2 of the downstream side fin plate portion 72b is set to be larger than the inclined angle θ1 of the upstream side fin plate portion 72a. Thus, the inclined angles θ1 and θ2 of the fin plate portions 72a and 72b are set in such a manner that the angle increases toward the downstream side from the upstream side. In other words, the inclined angles θ1 and θ2 of the fin plate portions 72a and 72b increase toward the downstream side from the upstream side, continuously or in a stepwise manner.

An upstream side distal end portion of the axial core body 73, supporting the side end surfaces of the mixing fins 72 on the inner side in the radial direction, has a tapered shape (conic shape) tapered toward the upstream side with a cross-sectional area decreasing toward the upstream side. A downstream side base end portion of the axial core body 73 has a tapered shape (conic shape) tapered toward the downstream side with the cross-sectional area decreasing toward the downstream side. Thus, the exhaust gas flowing into a portion around the axial core of the mixer pipe body 71 is guided by the upstream side distal end portion of the axial core body 73, having the tapered shape, to each of the mixing fins 72 on an outer side in the radial direction.

Figure 4:
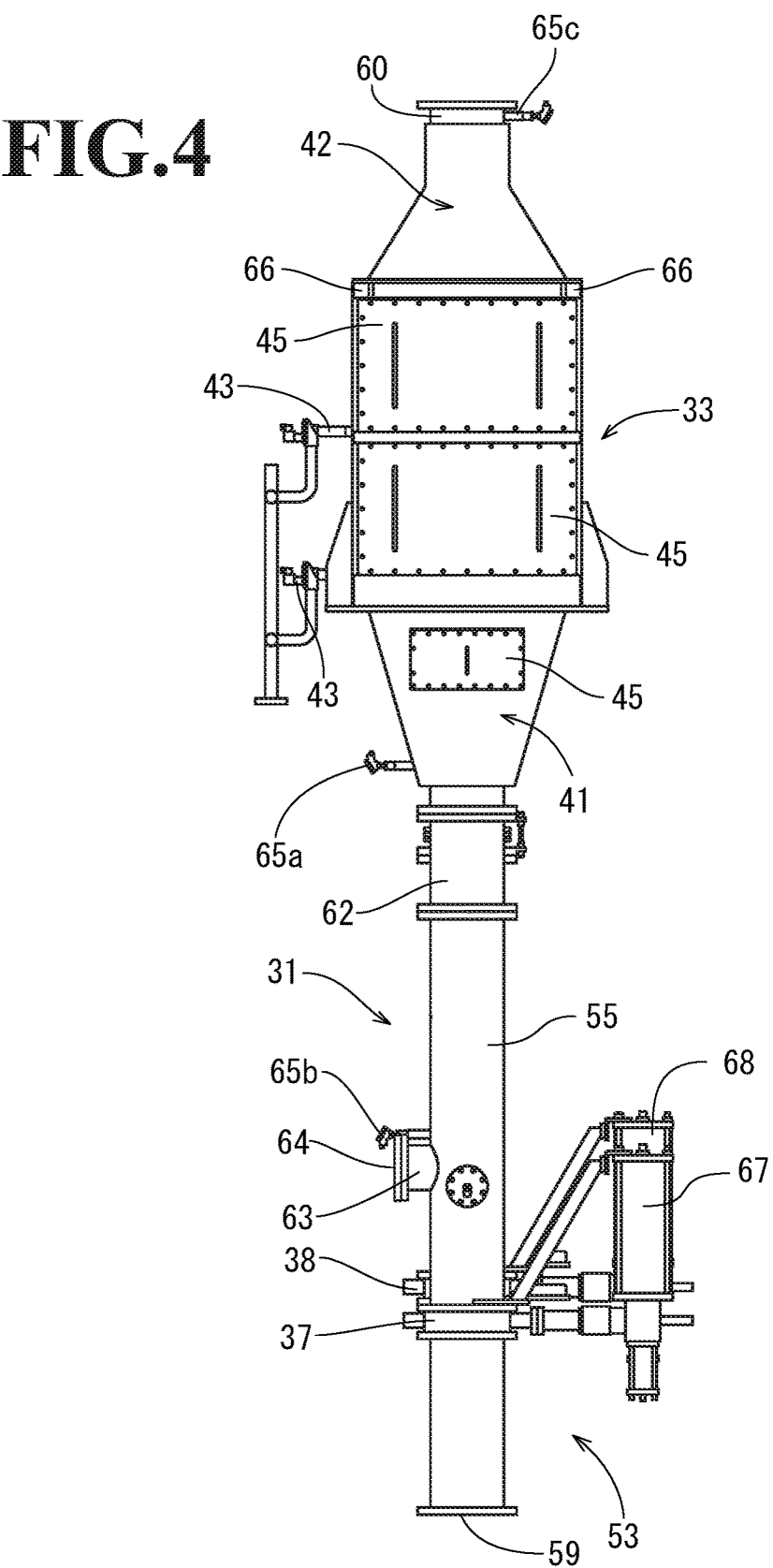
FIG. 4 is a side view of the composite casing.
Figure 5:
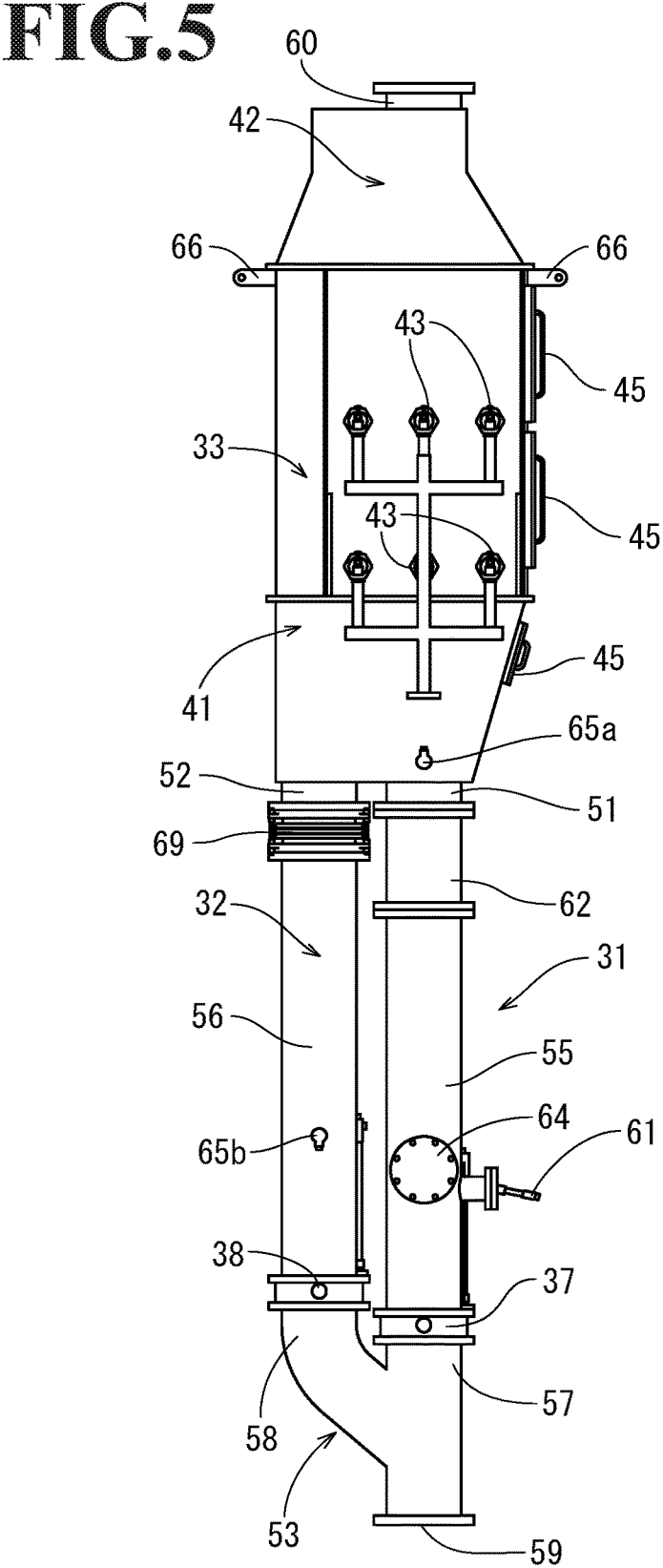
FIG. 5 is a rear view of the composite casing.

As illustrated in FIGS. 4 and 5, a main side inlet temperature sensor 65a is provided to the exhaust inlet portion 41 on the side of the main path 31 of the composite casing 33, and detects the temperature of the exhaust gas flowing into the side of the main path 31 in the composite casing 33. A bypass side inlet temperature sensor 65b is provided to the bypass side relay pipe 56 and detects the temperature of the exhaust gas flowing to the side of the bypass path 32 in the composite casing 33. An outlet temperature sensor 65c is provided to the exhaust air discharge pipe 60 of the composite casing 33 and detects the temperature of the exhaust gas that has passes through the side of the main path 31 or the side of the bypass path 32.

Figure 3:
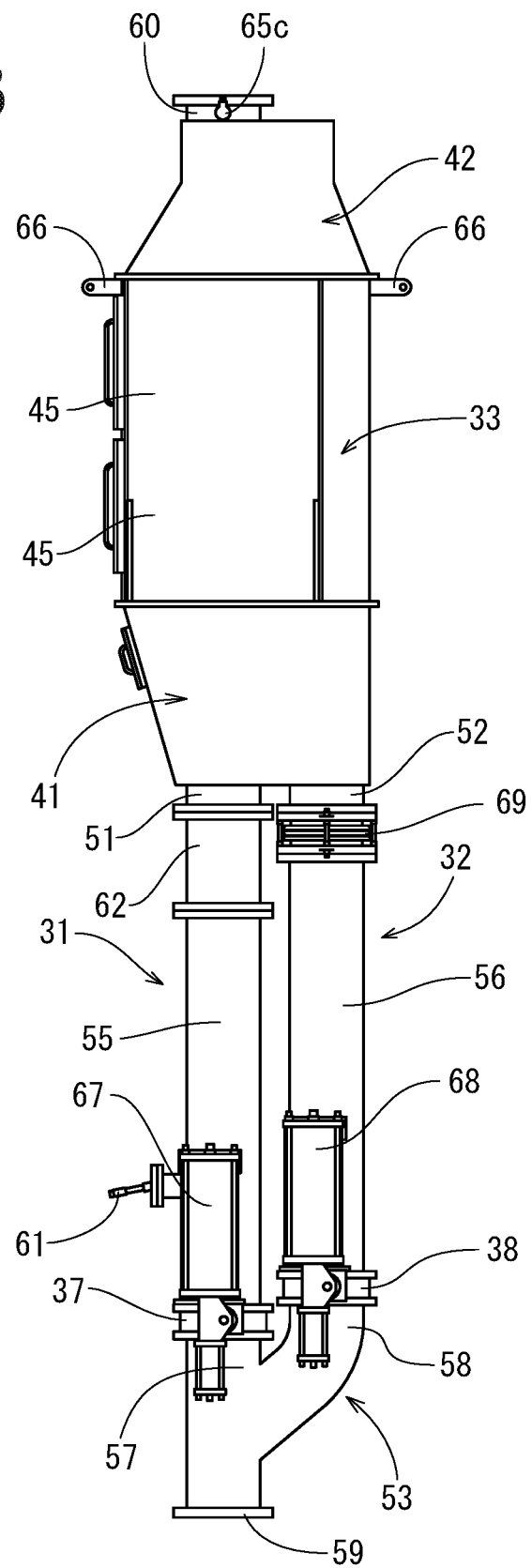
FIG. 3 is a front view of a composite casing.

As illustrated in FIGS. 3 to 5, a plurality of suspension attachments 66 are integrally formed with the outer circumference side of the upper portion of the composite casing 33. Here, two suspension attachments 66 (four in total) are attached to an upper portion side of each of two parallel side surfaces of the composite casing 33 with an approximately rectangular tubular shape. For example, in a factory where the ship 1 is assembled, hooks of a chain block (not illustrated) are engaged with the group of suspension attachments 66. Thus, the composite casing 33 can be easily assembled to the upper portion side (on the second deck 14 as the upper stage in the engine room 11) of the engine room 11, with the composite casing 33 hoisted/lowered by the chain block.

(3) Discharge Path Switching Operation

The main path 31 and the bypass path 32, in each of the discharge paths 30, are respectively provided with the main side switching valve 37 and the bypass side switching valve 38 (in three sets, and thus six in total in an embodiment) each serving as an opening/closing member that opens/closes a corresponding one of the paths. When one of the main side switching valve 37 and the bypass side switching valve 38 is open, the other one is closed so that a path through which the exhaust gas passes is selected. The main side switching valve 37 and the bypass side switching valve 38 are each opened/closed in accordance with the state of a corresponding one of the generator engines 25 and the type of used fuel.

When the bypass side switching valve 38 is closed and the main side switching valve 37 is open, a discharge stroke after the expansion stroke is performed as follows. Specifically, the exhaust gas sent to the main paths 31, from the plurality of generator engines 25, is subjected to the purification processing while passing through the NOx catalyst 34 and the slip processing catalyst 35 in each main path 31, and then is discharged outside the ship 1. When the main side switching valve 37 is closed and the bypass side switching valve 38 is open, the exhaust gas is directly discharged outside the ship 1 through the bypass path 32 (not passing through the NOx catalyst 34 and the slip processing catalyst 35).

As described above, the main side switching valve 37 and the bypass side switching valve 38, each serving as the opening/closing member that opens/closes a corresponding one of the discharge paths 31 and 32, are respectively provided to the main path 31 and the bypass path 32 in each discharge path 30. Thus, the path through which the exhaust gas passes can be selected as appropriate, only by switching the open/close states of the main side switching valve 37 and the bypass side switching valve 38, between a case where the purification processing is required for the exhaust gas and a case where the purification processing is not required, more specifically, for example, between a case where the ship is travelling in a regulated sea area and a case where the ship is travelling outside the regulated sea area. Thus, the exhaust gas can be efficiently treated. For example, when the purification processing for the exhaust gas is not required, the exhaust gas can be guided to the side of the bypass path 32, directly in communication with the outside, so that the NOx catalyst 34 and the slip processing catalyst 35 are bypassed. Thus, the NOx catalyst 34 and the slip processing catalyst 35 are not unnecessarily exposed to the exhaust gas when the purification processing for the exhaust gas is not required, whereby an attempt to achieve longer service lives of the NOx catalyst 34 and the slip processing catalyst 35 is facilitated.

As described above, the main side switching valve 37 and the bypass side switching valve 38 are operated by fluid, and stay open when no fluid is supplied thereto (normally open type). The main side switching valve 37 and the bypass side switching valve 38 are drivingly switched respectively by a main side valve driver 67 and a bypass side valve driver 68 that each include a single-acting pneumatic cylinder. The main side valve driver 67 is arranged on the outer circumference side of the main side relay pipe 55 while being in parallel with the longitudinal direction of the main side relay pipe 55. The bypass side valve driver 68 is arranged on the outer circumference side of the bypass side relay pipe 56 while being in parallel with the longitudinal direction of the bypass side relay pipe 56.

Figure 11:
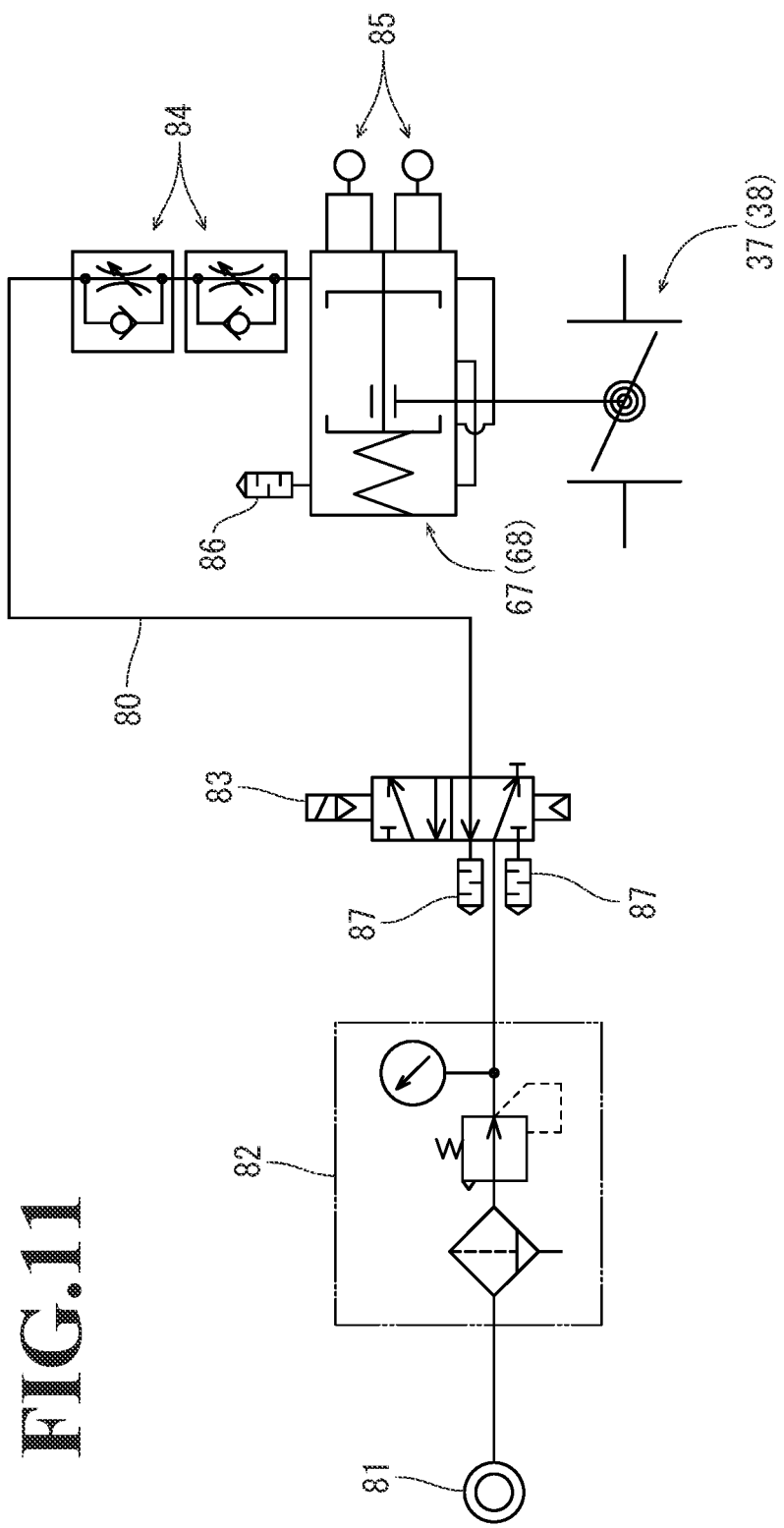
FIG. 11 is a circuit diagram of a fluid communication pipe for operating switching valves.

The valve drivers 67 and 68, respectively provided for the main side switching valve 37 and the bypass side switching valve 38, are each connected to a fluid supply source 81 via a fluid communication pipe 80, as illustrated in FIG. 11. The fluid supply source 81 supplies air as a compressed fluid for operating the valve drivers 67 and 68 (for operating the main side switching valve 37 and the bypass side switching valve 38). An intermediate section of the fluid communication pipe 80, on each of the main side and the bypass side, includes a filter regulator 82, a solenoid valve 83, and a flowrate adjuster 84 that are arranged in this order from the upstream side. The solenoid valve 83 switches ON and OFF the fluid supply to the valve drivers 67 and 68. The flowrate adjuster 84 includes a close side adjuster and an open side adjuster. Each solenoid valve 83 operates, based on control information, to supply the compressed fluid to the valve drivers 67 and 68 for a corresponding one of the switching valves 37 and 38, or to stop the fluid supply. The valve drivers 67 and 68 are each provided with a limit switch 85 that detects whether the switching valves 37 and 38 are open/closed, and are each connected to a silencer 86. Each solenoid valve 83 is connected to silencers 87.

Figure 12:
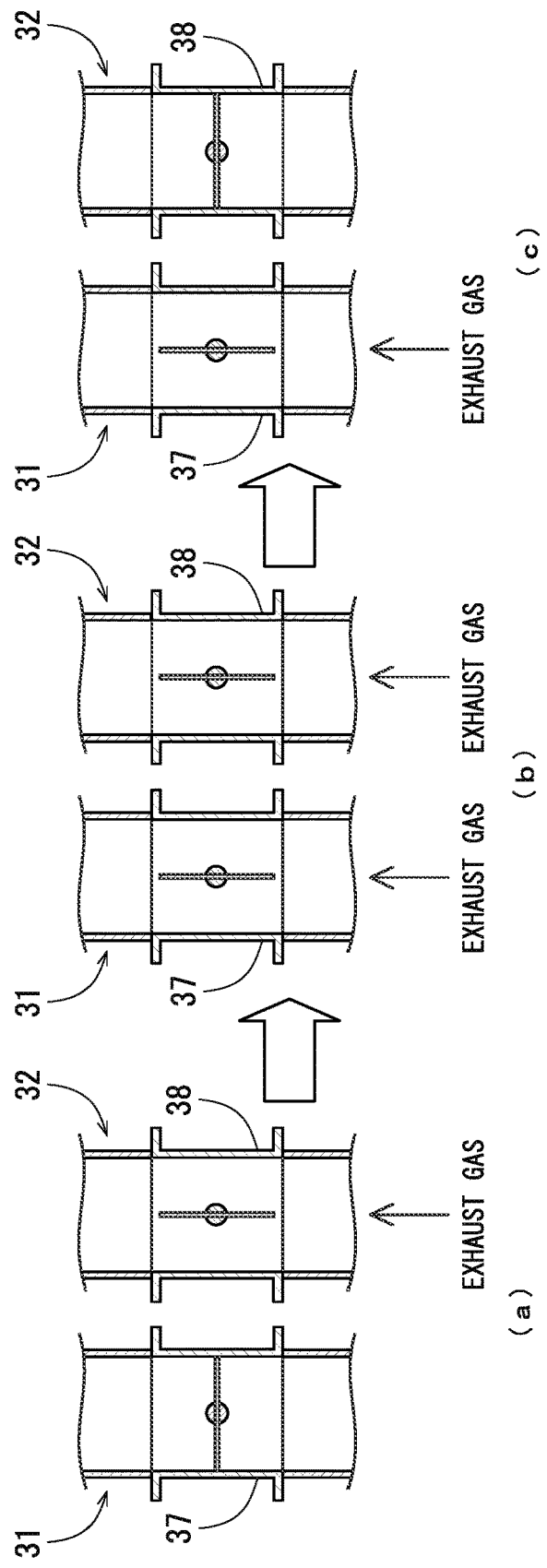
FIG. 12 is a schematic view illustrating a discharge path switching operation.

When the path through which the exhaust gas passes is switched, the fluid supply to the solenoid valves 83 on both the main side and the bypass side stops, and thus the fluid supply to the main side switching valve 37 and the bypass side switching valve 38 stops. As described above, the main side switching valve 37 and the bypass side switching valve 38 are each of a normally open type, and thus are respectively driven by the valve drivers 67 and 68 to be open when the fluid supply stops. Then, the fluid is supplied to the solenoid valve 83 on a side where the exhaust gas does not pass through so that the valve on the side supplied with the fluid is closed, whereas the solenoid valve 83 on a side where the exhaust gas is to pass through stays in a state without the fluid supply so that the switching valve stays open. In this manner, the path through which the exhaust gas passes is switched. For example, the main side switching valve 37 and the bypass side switching valve 38 are operated as follows. Specifically, in a state where the main side switching valve 37 is closed and the bypass side switching valve 38 is open (see FIG. 12(a)), the main side switching valve 37 and the bypass side switching valve 38 are both opened (see FIG. 12(b)), and then a state where the bypass side switching valve 38 is closed and the main side switching valve 37 is open (see FIG. 12(c)) is achieved.

In the configuration described above, the exhaust gas passes through the main path 31 when the main side switching valve 37 is open and the bypass side switching valve 38 is closed. In the more specifically, the exhaust gas flows through the main side outlet portion 57 of the forked pipe 53, the main side relay pipe 55, the exhaust gas mixer 62, the main side introduction pipe 51, and the main side flow inlet 47 to flow to the side of the main path 31 in the composite casing 33, and then flows through the NOx catalyst 34 and the slip processing catalyst 35 to be subjected to the purification processing.

In this configuration, the exhaust gas including the aqueous urea solution in the mist form injected from the aqueous urea solution injection nozzle 61 is guided to the exhaust gas mixer 62 through the main side relay pipe 55. The movement direction of the exhaust gas is changed by upstream side fin plate portion 72a of each mixing fin 72 to a direction inclined by the inclined angle θ1, and then is further changed by the downstream side fin plate portion 72b to a direction inclined by the inclined angle θ2. Thus, the exhaust gas including the aqueous urea solution flows to the inner circumference surface of the mixer pipe body 71, and moves in the circumference direction along the inner circumference surface of the mixer pipe body 71. Thus, the swirling flow of exhaust gas is produced in the exhaust inlet portion 41 on the side of the main path 31 in the composite casing 33, whereby the exhaust gas and the aqueous urea solution are smoothly and efficiently mixed. The exhaust inlet portion 41 on the side of the main path 31 in the composite casing 33 has the tapered shape (conic shape) tapered toward the upstream side with a cross-sectional area decreasing toward the upstream side. Thus, the swirling flow of exhaust gas has a large swirling diameter, whereby the exhaust gas spreads over the NOx catalyst 34 on the side of the main path 31 in the composite casing 33 while being highly uniformly mixed with the aqueous urea solution.

(4) Operation and Effect of First Embodiment

In the configuration described above, the main side switching valve 37 and the bypass side switching valve 38 each include a single-action switching valve of a normally open type. Thus, the main path 31 and the bypass path 32 are not closed at the same time even in a situation where the fluid supply is turned OFF such as a situation where the exhaust gas path is switched while the engine 25 is operating. Thus, even when the path switching valve 37 or 38 fails, the path switching valves 37 and 38 can be prevented from being closed at the same time, while the engine 25 is operating.

In the first embodiment, when the pass through which the exhaust gas passes is switched from one of the paths 31 and 32 to the other, the fluid supply to the main side switching valve 37 and the bypass side switching valve 38 is turned OFF so that the main side switching valve 37 and the bypass side switching valve 38 are opened, and then the fluid supply resumes for one of the single-action switching valve to be closed. Thus, even when the path switching valve 37 or 38 fails, the main path 31 and the bypass path 32 can be prevented from being closed at the same time when the exhaust gas path is switched. This ensures that the exhaust gas path is prevented from being closed while the engine 25 is operating.

As described above, the path switching valves 37 and 38 can be prevented from being closed at the same time. Thus, power generation by the diesel generator 24 can be prevented from stopping due to the stopping of the generator engine 25, whereby power supply to the electric system of the ship 1 can be guaranteed. This ensures that devices, such as various auxiliary machines, a cargo handling device, lights, and an air conditioner, can be prevented from being out of commission.

(5) Discharge Path Switching Operation in Second Embodiment

Figure 13:
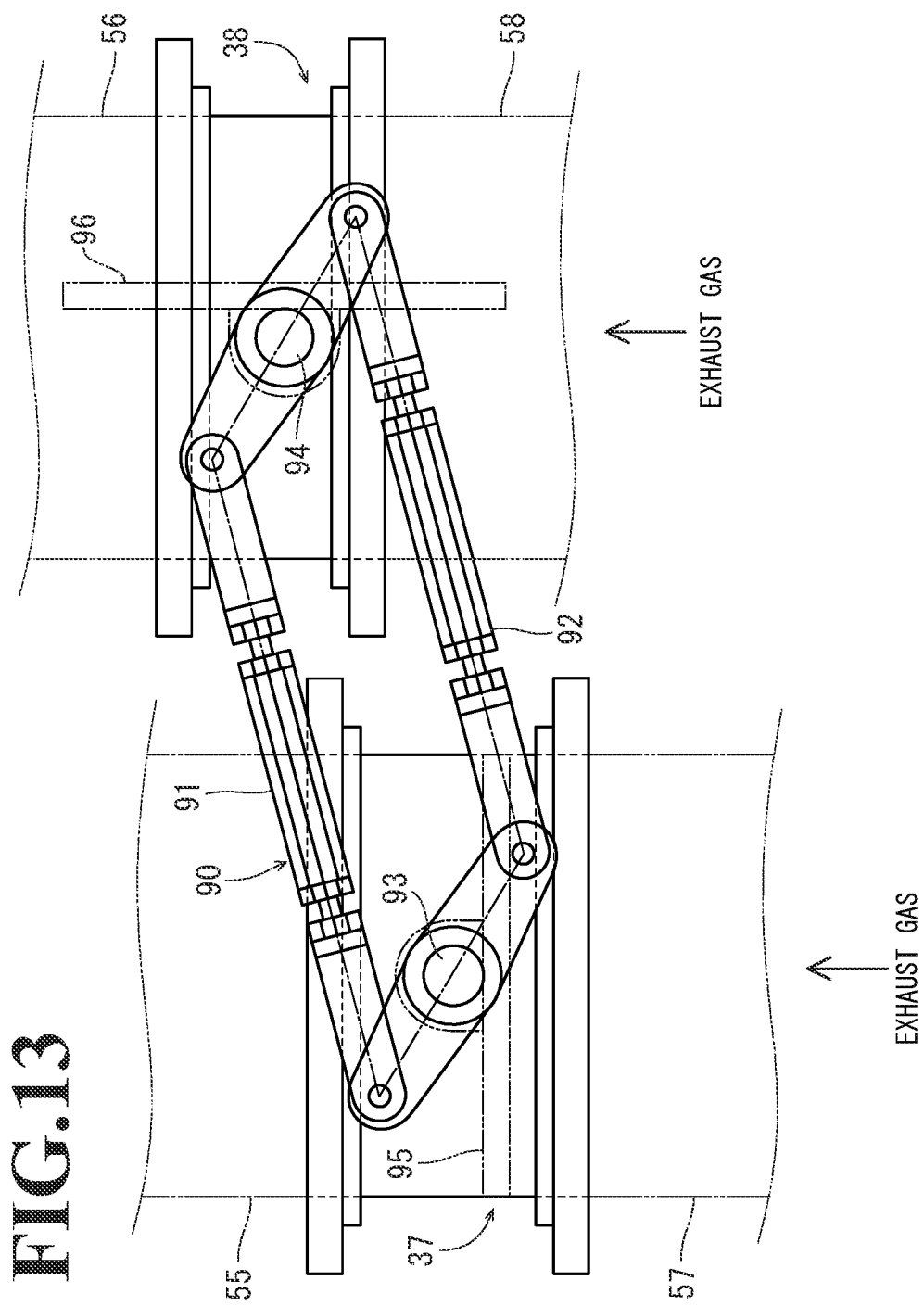
FIG. 13 is a front view of switching valves and a link mechanism according to a second embodiment.
Figure 14:
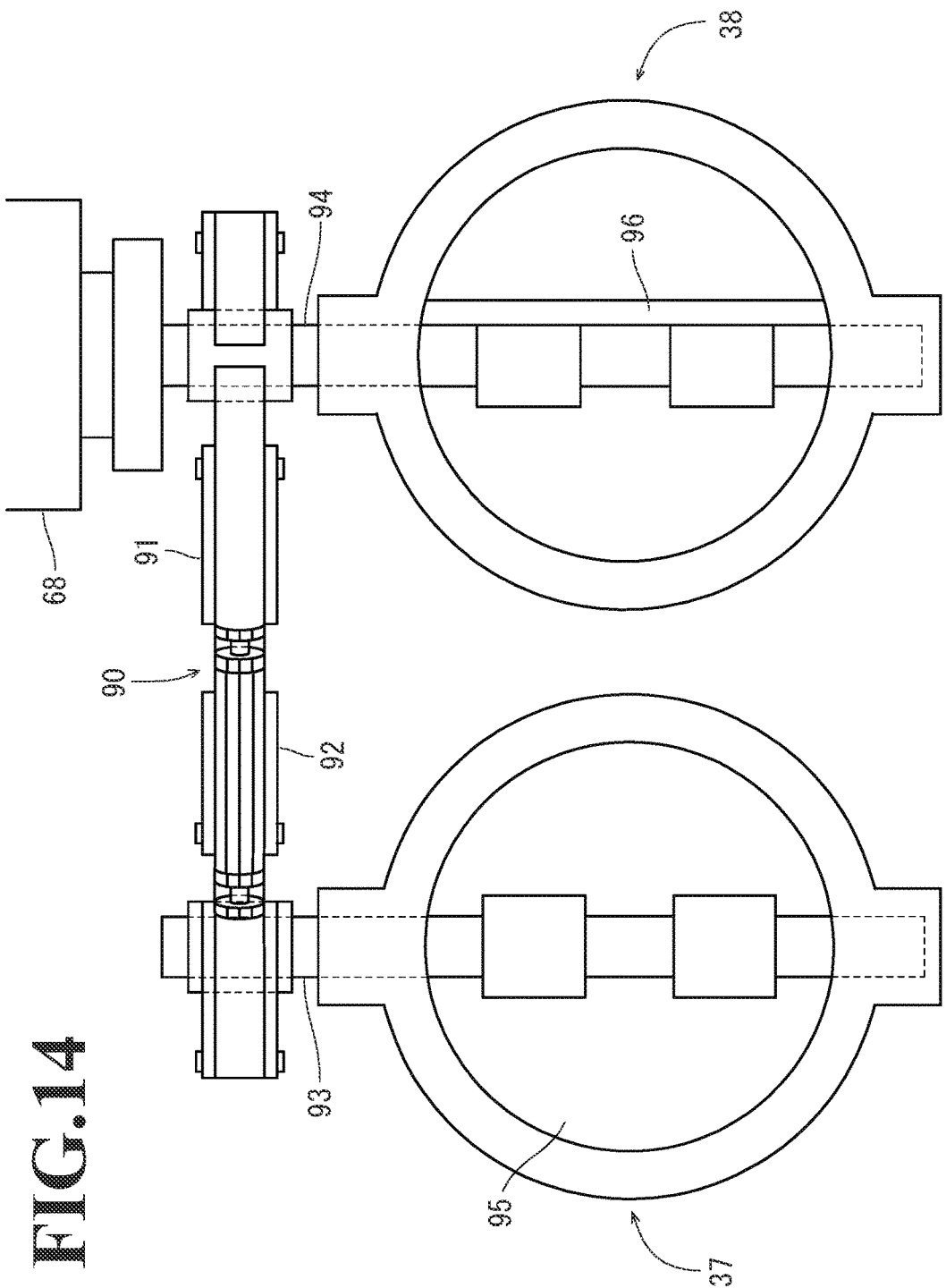
FIG. 14 is a plan view of the switching valves and the link mechanism according to the second embodiment.

Next, an exhaust system for the generator device 23 according to a second embodiment will be described with reference to FIGS. 13 and 14. In the second embodiment, the main side switching valve 37 and the bypass side switching valve 38 are coupled to each other in a linked manner via a link mechanism 90 so that when one of the valves is open, the other one is closed. More specifically, the link mechanism 90 is disposed between a main side driving shaft 93 of the main side switching valve 37 and a bypass side driving shaft 94 of the bypass side switching valve 38. The link mechanism 90 has a duplex structure: including an upper link lever 91 and a lower link lever 92 that are each disposed above the main side driving shaft 93 and the bypass side driving shaft 94. A main side valve body 95 of the main side switching valve 37 and a bypass side valve body 96 of the bypass side switching valve 38 are provided in such a manner that when one of the valves is open, the other one is closed. More specifically, the main side valve body 95 and the bypass side valve body 96 are disposed to have angles (attachment phase) relative to the flowing direction of the exhaust gas shifted from each other by 90° in front view. In the second embodiment, the link mechanism 90 is disposed between the main side driving shaft 93 and the bypass side driving shaft 94, and thus only one valve driver needs to be directly coupled to the main side or the bypass side. In this embodiment, the switching valves 37 and 38 are both driven only by the valve driver 68, directly coupled to the bypass side driving shaft 94. The other configurations are approximately the same as those in the first embodiment.

(6) Operation and Effect of Second Embodiment

In the configuration according to the second embodiment, the main side switching valve 37 and the bypass side switching valve 38 are coupled to each other via the link mechanism 90 in a linked manner so that when one of the valves is open, the other one is closed. Thus, one of the switching valves 37 and 38 is definitely open, whereby complete closing of the main path 31 and the bypass path 32 can be prevented. Thus, the exhaust gas path is not closed while the engine 25 is operating, whereby the engine 25 can be prevented from stopping with the exhaust gas trapped. Furthermore, in the second embodiment, the link mechanism 90 has the duplex structure including the upper link lever 91 and the lower link lever 92. Thus, even when one of the link levers is damaged or fails, both switching valves can be operated by the remaining other link lever, whereby both paths can be prevented from being closed completely at the same time. A load produced while the link mechanism 90 is under operation is shared between the upper link lever 91 and the lower link lever 92. Thus, a long service life of the link levers 91 and 92 can be achieved, and an attempt to achieve high redundancy of the link structure for the switching valves 37 and 38 can be facilitated. With the link mechanism 90 thus provided, the switching valves 37 and 38 can both be driven only with a single valve driver. Thus, only one valve driver needs to be provided, whereby an attempt to simplify the structure and reduce the manufacturing cost can be facilitated. In the second embodiment, the valve driver does not necessarily need to be of a normally open singe-acting type, and may be a double-acting type valve driver.

(7) Discharge Path Switching Operation According to Third Embodiment

Figure 15:
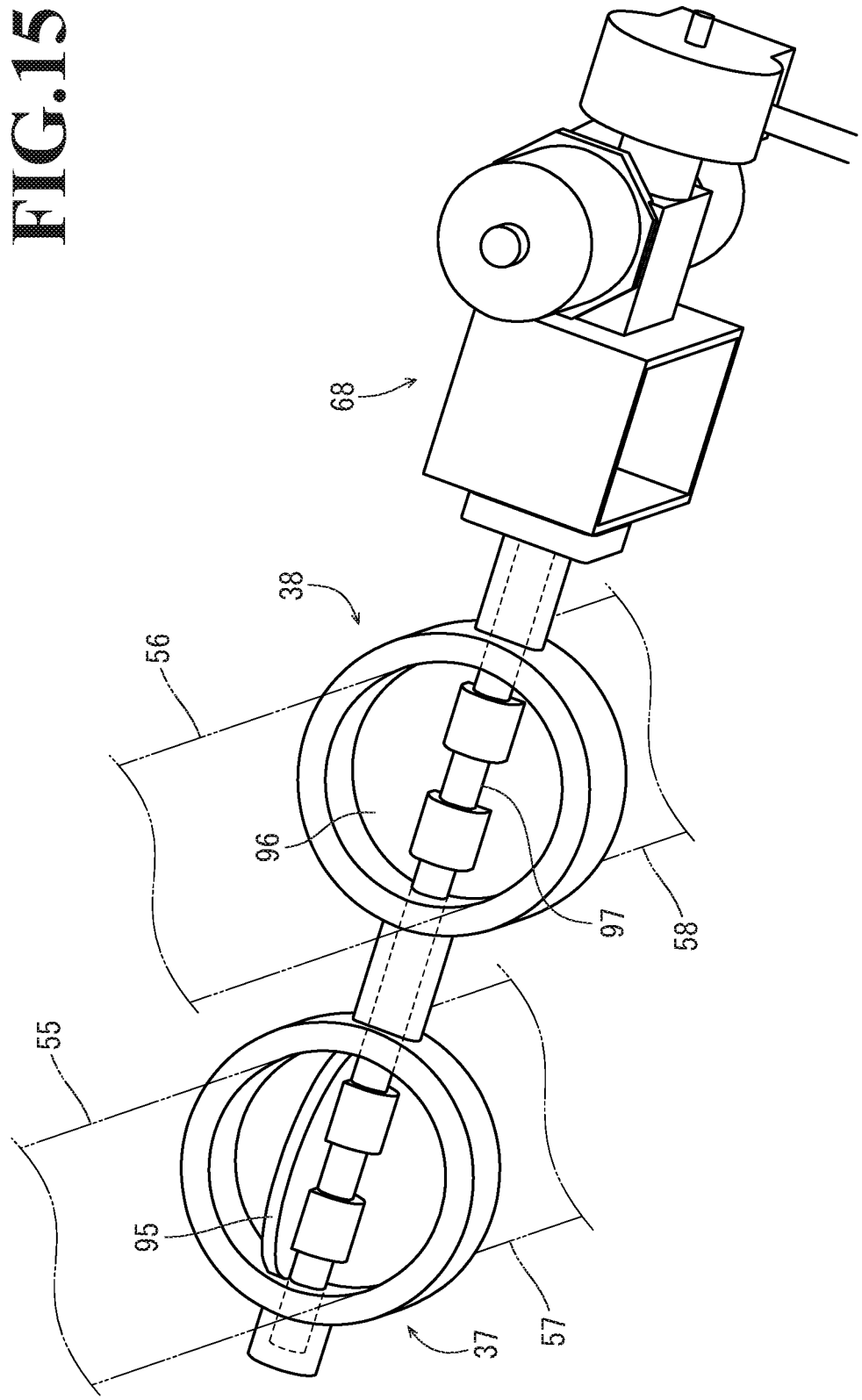
FIG. 15 is a perspective view of an axially linking structure for the switching valves according to a third embodiment.

Next, an exhaust system for the generator device 23 according to a third embodiment will be described with reference to FIG. 15. In the third embodiment, the main side switching valve 37 and the bypass side switching valve 38 are axially supported by a single rotation shaft 97. More specifically, a main side valve body 95 of the main side switching valve 37 and a bypass side valve body 96 of the bypass side switching valve 38 are both axially supported by the rotation shaft 97. Thus, the main side switching valve 37 (main side valve body 95) and the bypass side switching valve 38 (bypass side valve body 96) are driven in a linked manner by the rotation shaft 97. In the third embodiment, the main side switching valve 37 and the bypass side switching valve 38 have attachment phases, relative to the rotation shaft 97, shifted from each other by 90°. More specifically, the main side valve body 95 and the bypass side valve body 96 have attachment phases, relative to the rotation shaft 97, shifted from each other by 90°. For example, as illustrated in FIG. 15, when the main side switching valve 37 is open, the bypass side switching valve 38 is closed. In the third embodiment, the main side switching valve 37 and the bypass side switching valve 38 are axially supported by the single rotation shaft 97, and thus only a single valve driver is required. In the third embodiment, both switching valves 37 and 38 are driven only by the valve driver 68. The other configurations are approximately the same as those in the first embodiment.

(8) Operation and Effect of Third Embodiment

In the configuration according to the third embodiment, the main side switching valve 37 and the bypass side switching valve 38 are axially supported by the single rotation shaft 97, whereby both switching valves 37 and 38 can be driven in a linked manner with only the rotation shaft 97. Thus, both switching valves 37 and 38 need not to be each provided with the rotation shaft, and can be driven by a single valve driver. Thus, only one valve driver needs to be provided, whereby an attempt to achieve a simple structure and reduce the manufacturing cost can be facilitated. The main side switching valve 37 and the bypass side switching valve 38 have the attachment phases, relative to the rotation shaft 97, shifted from each other by 90°. Thus, both switching valves 37 and 38 are operated in a linked manner so that when one of the switching valves is open, the other one is closed. Thus, one of the switching valves 37 and 38 is definitely open, whereby complete closing of both the main path 31 and the bypass path 32 can be prevented. All things considered, the exhaust gas path is not closed while the engine 25 is operating, whereby the engine 25 can be prevented from stopping with the exhaust gas trapped.

(9) Discharge Path Switching Operation According to Fourth Embodiment

Figure 16:
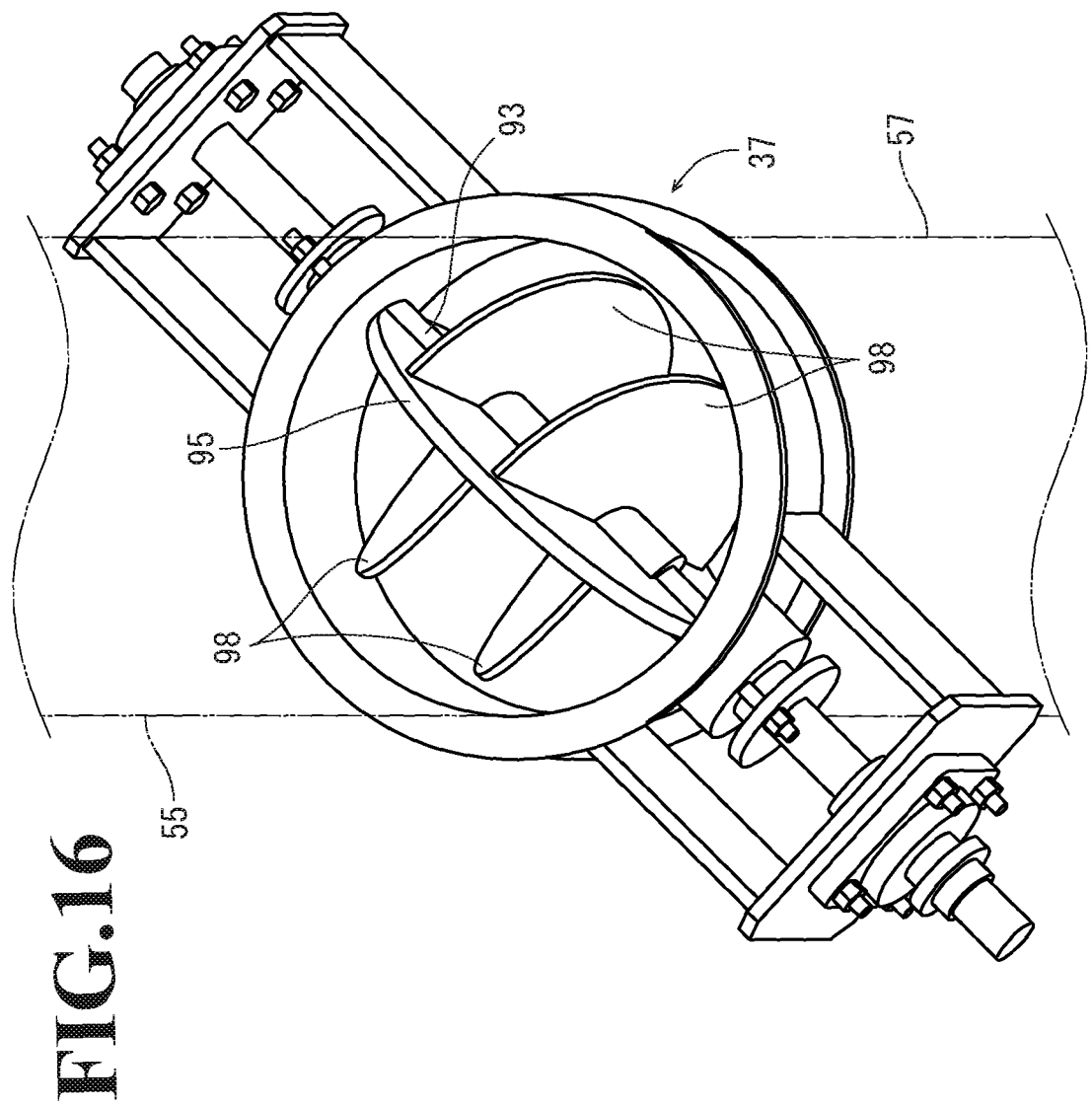
FIG. 16 is a perspective view illustrating a structure of a switching valve according to a fourth embodiment.
Figure 17:
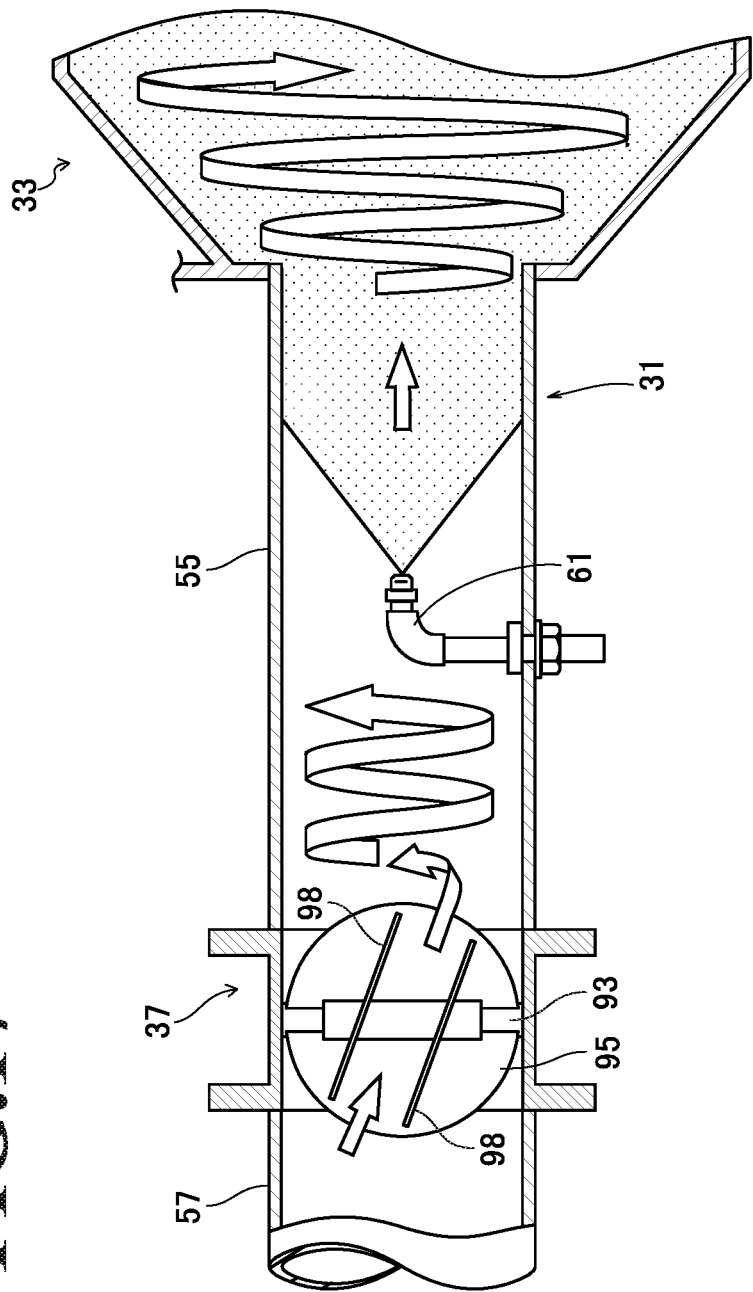
FIG. 17 is a side cross-sectional view illustrating a flow of exhaust gas according to the fourth embodiment.

Next, an exhaust system for the generator device 23 according to the fourth embodiment will be described with reference to FIGS. 16 and 17. In the fourth embodiment, the main side valve body 95 of the main side switching valve 37 is provided with a plurality of (four in the fourth embodiment) mixing fins 98 that produce a turbulent flow of exhaust gas, flowing in the discharge path 30 while the main side switching valve 37 (main side valve body 95) is open. The mixing fins 98 are integrally formed with the main side valve body 95 and are each inclined with respect to the exhaust gas passing direction by a predetermined angle. In this configuration, two mixing fins 98 are formed on each sides of the main side valve body 95. The mixing fin 98 formed on one side of the main side valve body 95 is orthogonal to the mixing fin 98 formed on the other side of the main side valve body 95. The number of the mixing fins 98 is not limited to four as in the fourth embodiment. As illustrated in FIG. 17, the aqueous urea solution injection nozzle (reductant injection nozzle) 61 is disposed on a downstream side of the main side switching valve 37 in the discharge path 30. The aqueous urea solution injection nozzle 61 according to the fourth embodiment injects the aqueous urea solution into the exhaust gas flowing in the turbulent flow produced by the mixing fins 98. Thus, with the mixing fin 98, the turbulence flow of the exhaust gas is produced on the upstream side of the aqueous urea solution injection nozzle 61. Thus, the exhaust gas mixer 62 dedicated for mixing the exhaust gas and the aqueous solution needs not to be provided, and thus is not used in the fourth embodiment. The other configurations are approximately the same as those in the first embodiment. The main side switching valve 37 and the bypass side switching valve 38 may operate in a linked manner via the link mechanism as in the second embodiment, or may operate in a linked manner via a shaft as in the third embodiment.

(10) Operation and Effect of Fourth Embodiment

In the configuration according to the fourth embodiment, the main side valve body 95 of the main side switching valve 37 is provided with the plurality of mixing fins 98 that produce the turbulent flow of exhaust gas flowing in the discharge path 30. Thus, the dedicated exhaust gas mixer 62 needs not to be provided in the discharge path 30, whereby an attempt to reduce the number of parts, achieve a simple structure, and reduce the manufacturing cost can be facilitated. The aqueous urea solution injection nozzle 61 is disposed on the downstream side of the main side switching valve 37 provided with the mixing fins 98. Thus, the reductant is injected into the exhaust gas flowing in the turbulent flow produced by the mixing fins 98, whereby efficient mixing between the exhaust gas and the reductant can be achieved. Thus, with a simple structure, NOx in the exhaust gas can be efficiently reduced, and thus can be removed as much as possible.

(11) Other Embodiments

The configurations of the components are not limited to the embodiments illustrated in the figures, and can be modified in various ways without departing from the gist of the present invention. In the embodiments described above, the present invention is applied to the exhaust purification system disposed in the discharge path 30 of the generator engine 25. However, this should not be construed in a limiting sense. For example, the present invention may be applied to an exhaust purification system in an exhaust system for the main engine 21.

What is claimed is:
1. An exhaust purification system for a ship, the exhaust purification system comprising:
    a main path in communication with outside and a bypass path branched from an intermediate portion of the main path, each of the main path and the bypass path configured to serve as a discharge path for exhaust gas of an engine installed on the ship;
    a plurality of fluid operated switching valves of a normally open type, which are configured to be kept in an open state if no fluid is supplied, the plurality of fluid operated switching valves comprises:
        a main side switching valve on the main path; and
        a bypass side switching valve on the bypass path; and
    one or more solenoid valves configured to, based on control information, control flow of the fluid to cause operation of the plurality of fluid operated switching valves, wherein the control information comprises:
        opening the main side switching valve on the main path and closing the bypass side switching valve on the bypass path to enable purification of the exhaust gas,
        turning off the supply of fluid to place each of the main side switching valve and bypass side switching valve in an open state in which the exhaust gas is not purified, and
        after each of the main side switching valve and the bypass side switching valve are in the open state, closing the main side switching valve and maintaining the bypass side switching valve in the open state.

2. The exhaust purification system according to claim 1, further comprising the engine.

3. The exhaust purification system according to claim 1, wherein:
    the main side switching valve and the bypass side switching valve are configured together to prohibit the main side switching valve and the bypass side switching valve from both being in a closed state during operation of the engine.

4. The exhaust purification system according to claim 1, further comprising:
    one or more valve drivers coupled to the one or more solenoid valves, the one or more valve drivers configured to operate the plurality of fluid operated switching valves based on the fluid.

5. The exhaust purification system according to claim 1, wherein:
    the main side switching valve comprises a valve body that has a mixing fin configured to produce a turbulent flow of the exhaust gas while the main side switching valve is open.

6. The exhaust purification system according to claim 5, further comprising:
    a reductant injection nozzle positioned on a downstream side of the switching valve within the main path.

7. An exhaust purification method for an exhaust purification system for a ship, the exhaust purification system comprising:
    a main path in communication with outside and a bypass path branched from an intermediate portion of the main path, each serving as a discharge path for exhaust gas of an engine, the main path and the bypass path are provided with, and opened and closed by, respective fluid operated switching valves of a normally open type, which are configured to be kept in an open state if no fluid is supplied, the fluid operated switching valves comprising a main side switching valve on the main path and a bypass side switching valve on the bypass path, the method comprising:
    opening the main side switching valve and closing the bypass side switching valve to purify exhaust gas, turning off the supply of fluid to both switching valves to place both switching valves in the open state to switch to a state in which the exhaust gas is not purified, and after placing both switching valves in the open state, closing the main side switching valve and maintaining the bypass side switching valve in the open state.

* * * * *